United States Patent
Andre

(10) Patent No.: US 7,341,286 B2
(45) Date of Patent: Mar. 11, 2008

(54) FLUID COUPLING WITH DUAL FUNCTION RETENTION RING

(75) Inventor: Michael J. Andre, Waterford, MI (US)

(73) Assignee: Cooper Standard Automotive, Inc., Novi, MI (US)

(*) Notice: Subject to any disclaimer, the term of this patent is extended or adjusted under 35 U.S.C. 154(b) by 261 days.

(21) Appl. No.: 11/008,388

(22) Filed: Dec. 9, 2004

(65) Prior Publication Data

US 2006/0125235 A1 Jun. 15, 2006

(51) Int. Cl.
*F16L 39/00* (2006.01)
*F16L 21/02* (2006.01)

(52) U.S. Cl. ............ 285/319; 285/340; 285/321; 285/104; 285/322; 285/374

(58) Field of Classification Search .......... 285/340, 285/319, 214, 217, 321, 104, 322, 323, 324, 285/376, 377, 374
See application file for complete search history.

(56) References Cited

U.S. PATENT DOCUMENTS

| | | | | |
|---|---|---|---|---|
| 3,922,011 A | * | 11/1975 | Walters | 285/277 |
| 4,586,734 A | * | 5/1986 | Grenier | 285/340 |
| 4,662,662 A | * | 5/1987 | Delhaes | 285/379 |
| 4,842,306 A | * | 6/1989 | Zeidler et al. | 285/104 |
| 4,889,368 A | | 12/1989 | Laipply | |
| 4,911,406 A | | 3/1990 | Attwood | |
| 5,022,687 A | | 6/1991 | Ariga | |
| 5,160,179 A | | 11/1992 | Takagi | |
| 5,181,751 A | | 1/1993 | Kitamura | |
| 5,366,262 A | * | 11/1994 | Couvreur | 285/340 |
| 5,443,289 A | | 8/1995 | Guest | |
| 5,527,073 A | | 6/1996 | Readman | |
| 5,542,717 A | | 8/1996 | Rea et al. | |
| 5,573,279 A | | 11/1996 | Rea et al. | |
| 5,603,530 A | * | 2/1997 | Guest | 285/105 |
| 5,662,359 A | | 9/1997 | Kargula | |
| 5,730,475 A | | 3/1998 | Kargula | |
| 5,816,627 A | | 10/1998 | Readman | |
| 5,887,911 A | | 3/1999 | Kargula | |
| 6,241,292 B1 | | 6/2001 | Yang | |
| 6,347,815 B1 | | 2/2002 | Kargula et al. | |
| 6,378,912 B1 | | 4/2002 | Condon et al. | |

(Continued)

FOREIGN PATENT DOCUMENTS

DE 79 36 914 U1 11/1980

(Continued)

*Primary Examiner*—Daniel P. Stodola
*Assistant Examiner*—Jay R Ripley
(74) *Attorney, Agent, or Firm*—Young Basile Hanlon MacFarlane & Helmholdt, P.C.

(57) ABSTRACT

A fluid coupling includes a carrier carrying a retention ring with inward and outward radially and angularly extending fingers for respectively engaging an outer surface of an endform inserted through a bore in the carrier and the inner surface of a bore in a housing in which the carrier is mounted to fix the endform to the carrier and to fix the carrier to the housing. Inner and outer seal elements are also carried on the carrier to seal the carrier to the endform and the housing to the carrier. Both of the seal elements are disposed axially closer to one end of the carrier than the inward and outward extending fingers.

26 Claims, 9 Drawing Sheets

U.S. PATENT DOCUMENTS

| | | | |
|---|---|---|---|
| 6,390,511 B1 | 5/2002 | Kargula | |
| 6,464,266 B1 | 10/2002 | O'Neill et al. | |
| 6,488,319 B2 * | 12/2002 | Jones | 285/374 |
| 2003/0178844 A1 | 9/2003 | Klinger et al. | |
| 2003/0197375 A1 * | 10/2003 | Pickering | 285/322 |
| 2004/0070198 A1 * | 4/2004 | Rohrig | 285/39 |
| 2004/0080161 A1 * | 4/2004 | Matsushita | 285/322 |
| 2005/0040650 A1 * | 2/2005 | Chang | 285/340 |

FOREIGN PATENT DOCUMENTS

| | | |
|---|---|---|
| DE | 198 00 050 A1 | 7/1998 |
| EP | 0 972 981 A2 | 1/2000 |
| GB | 2089455 | 6/1982 |
| WO | WO 97/03314 | 1/1997 |

* cited by examiner

FLUID COUPLING WITH DUAL FUNCTION RETENTION RING

BACKGROUND

The present invention relates, in general, to fluid couplings for joining fluid carrying components.

Fluid connections or couplings are known for interconnecting metal or plastic tubes to each other. One of the tubes can also be a fluid operative component, such as a valve, manifold, pump, etc.

Such fluid connectors typically employ a retainer in the form of a ring with radially inward extending, flexible, spring-like fingers which bite into the smooth, constant diameter, tip end of the tube. The fingers allow removal of the tube by means of a release tool which is inserted into engagement with the inner surface of the fingers to deflect the fingers away from the tube.

The use of softer, plastic tubes, such as PEX (cross-linked polyethylene), introduces other factors which must be considered in constructing fluid couplings. The retainer fingers can scratch the surface of the tube during insertion of the tube into the housing carrying the retainer or upon removal of the tube from the housing. These scratches can form leak paths through the seal elements or O-rings mounted on the tube or can damage the seal elements, again leading to fluid leak paths and a defective fluid coupling.

In fluid couplings of the above-described type, after the seal elements and the retainer are mounted in the bore of a fluid use element or housing, an end flange on the coupling is non-removably joined to the fluid use component or housing by sonic or heat welding which forces the use of like materials with like melt temperatures, i.e., plastics, that would bond together.

It would be desirable to provide a fluid coupling which forms a fluid tight connection between an endform or tube and a fluid use element or housing while preventing scratches on the tube surface from damaging the seal elements of the fluid coupling. It would also be desirable to provide such a fluid coupling in which all of the connector components can be removed from the fluid use component or housing. It would also be desirable to provide a fluid coupling that does not require the use of like materials with like melting points for sonic or heat weldability such that an unlimited number of dissimilar materials with different melt temperatures can be employed.

SUMMARY

The present invention is a fluid coupling for joining two fluid use or fluid operative elements, such as conduits, valves, pumps, etc.

In one aspect, the fluid coupling includes a fluid use element having a bore extending from an open end. The bore has an inner surface. A carrier has a bore extending between first and second ends, with at least one aperture formed in the carrier intersecting the bore. A retention ring is mounted on the carrier and has at least one inward extending finger with the tip end extending through the aperture into the bore in the carrier, and at least one outward extending finger having a tip end extending outward from the carrier. The tip end of the outward extending finger engages the inner surface of the bore in the fluid use element to fix the carrier to the fluid use element. The tip end of the inward extending finger on the retention ring engages the endform to fix the endform to the carrier.

Inner and outer seals are disposed on the carrier. The seals can be separate O-rings or integrally carried on the carrier through a double shot molding process with the carrier.

The inner seal which seals an endform to a fluid use element to an endform inserted into the bore in the carrier with the carrier is disposed axially from the tip end of the inward extending fingers on the retention ring such that any portion of the service of the endform which is contacted by the inward extending fingers does not contact the seal element.

In another aspect, a plurality of inward extending fingers or a plurality of outwardly extending fingers are provided with a helical pitch by helically varying the length of the fingers about the circumference of the retention ring. This enables, in the case of a helical pitch formed on the inward extending fingers, for the endform to be unthreaded from the joined carrier and housing. In the case of a helical pitch on the outward extending fingers, the entire carrier and endform can be unthreaded from the housing.

The present fluid coupling provides improvements over existing fluid couplings by utilizing the same retainer to removably join the connector components to the fluid use element or outer housing as well as to join the endform or tube to the connector. The connector components of the present fluid coupling may also be assembled in two different ways, including fixed insertion in the fluid use element or housing prior to insertion of the endform into the housing or on the endform prior to joined insertion into the housing.

The present fluid coupling also spaces the seal elements axially from the retainer so as so prevent any scratches which may be formed in the surface of the endform by the retainer during endform insertion or removal from contacting the seal elements and damaging the seal elements or otherwise forming leak paths through the seal elements. The present fluid coupling also has a configuration which enable easy removal of the entire connector components from the fluid use element or housing.

BRIEF DESCRIPTION OF THE DRAWING

The various features, advantages and other uses of the present invention will become more apparent by referring to the following detailed description and drawing in which.

DETAILED DESCRIPTION

As described in greater detail hereafter, a fluid coupling is formed between two components, such as an endform and a fluid use element. The fluid use element can be any fluid carrying or fluid operative element, including a tube or conduit, a housing having a through bore, an endform, a valve, pump, or manifold, etc.

An endform, is defined as the geometry or shape on the end of a tubular member or fluid use element, typically having a through bore extending from an open end. The geometry or shape on the end of a tubular member which is defined by the term "endform" is meant to include any geometry or shape, including a smooth, constant diameter end, such as a straight, round tube end, as well as a tube end which has an irregular shape or profile other than a constant, smooth diameter.

Figure 1:
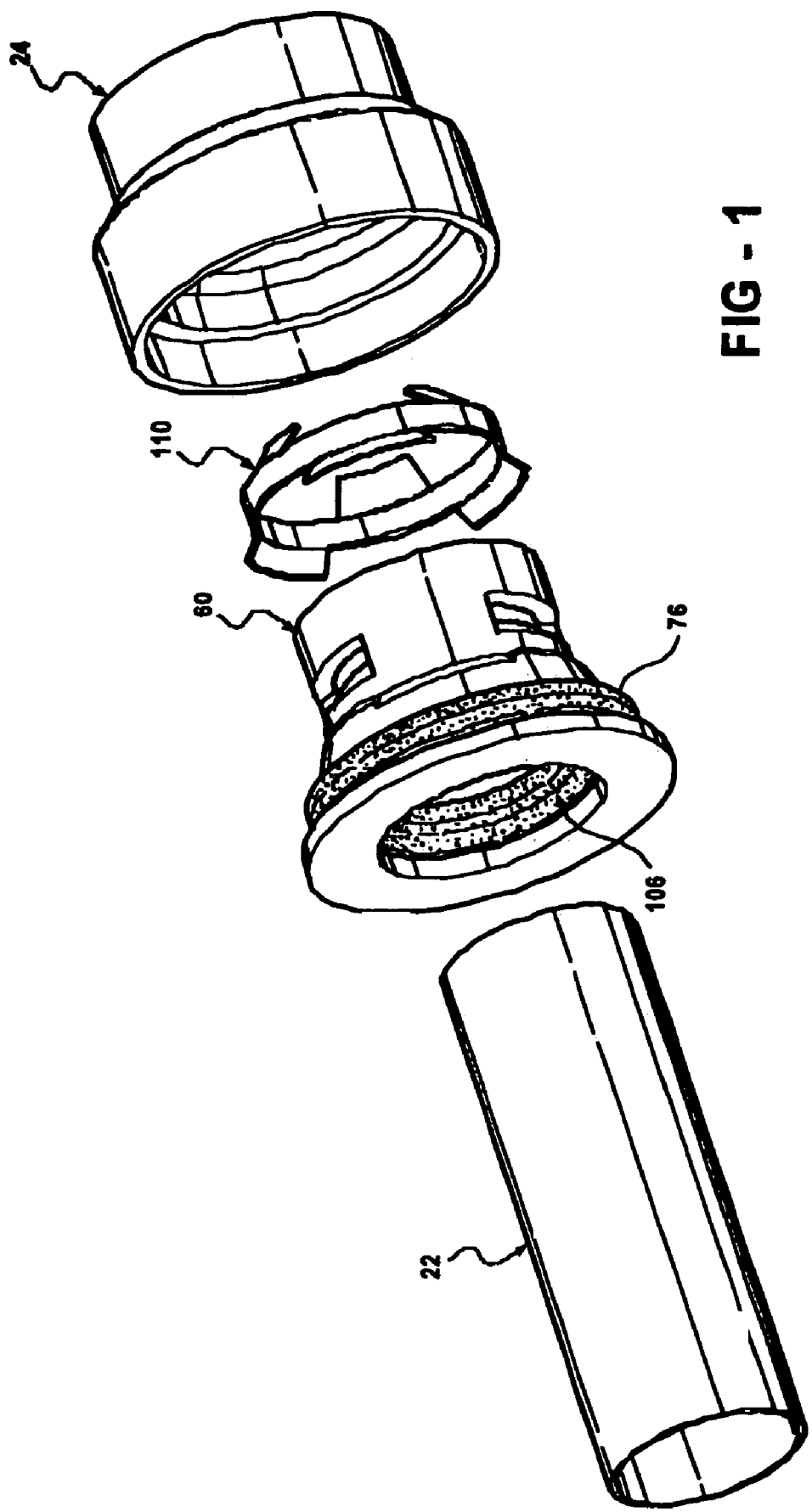
FIG. 1 is an exploded, perspective view of one aspect of a fluid coupling.
Figure 2:
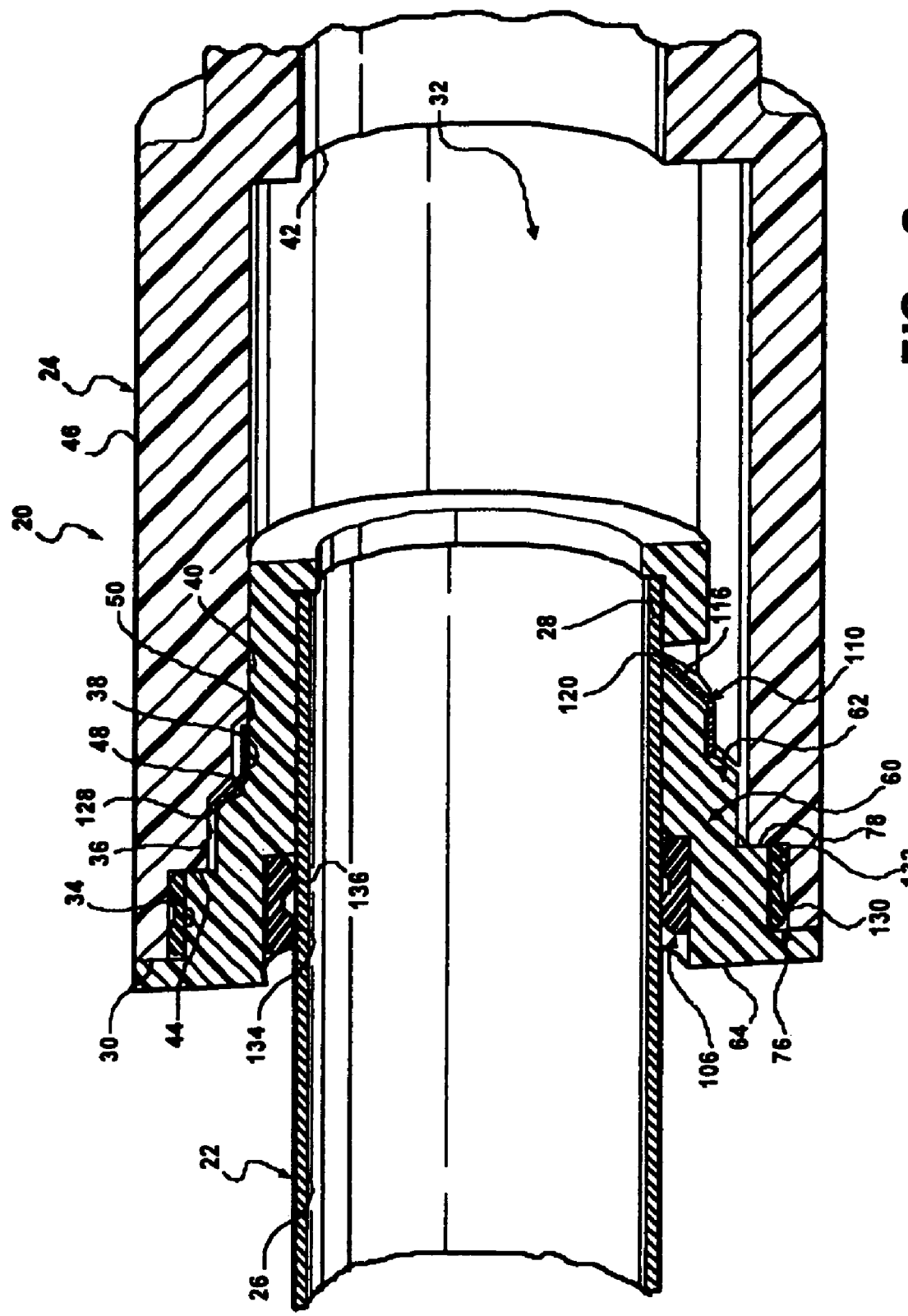
FIG. 2 is a perspective view of the fluid coupling shown in FIG. 1.

As shown in FIGS. 1 and 2, a fluid coupling 20 fluidically and sealingly couples an endform 22 to a fluid use element, hereafter defined as a housing 24. The endform 22 has a tubular, cylindrical shape with a bore 26 extending from an open first end 28. The endform 22 may be formed of any suitable material, such as metal, plastic, etc.

The housing 24 also has an open first end 30. A bore 32 extends through the housing 24 from the first end 30. By way of example only, the bore 32 is a stepped bore formed of a first large diameter bore 34 extending from the first end 30, a second smaller diameter bore 36 extending axially from the first bore 34, a third bore 38 extending axially from the second bore 36, and a fourth bore 40 extending axially from the third bore 38. A fifth bore 42 is shown in FIG. 1 by way of example only extending from the fourth bore 40.

The first and second bores 34 and 36 are separated by a surface 44 generally in the form of a shoulder extending perpendicularly from an outer surface 46 of the housing 24.

The second and third bores 36 and 38, respectively, are separated by a surface 48. In this aspect, the surface 48 defines a ramp or angled surface with respect to the outer surface 46 or a longitudinal axis of the housing 24.

The third and forth bores 38 and 40, respectively, are likewise separated by a surface 50 which is also angled or ramped with respect to the outer surface 46 ro longitudinal axis of the housing 24.

The angled or ramped surfaces 48 and 50 define support surfaces for finger portions of the retention ring or retainer as described hereafter.

Figure 3:
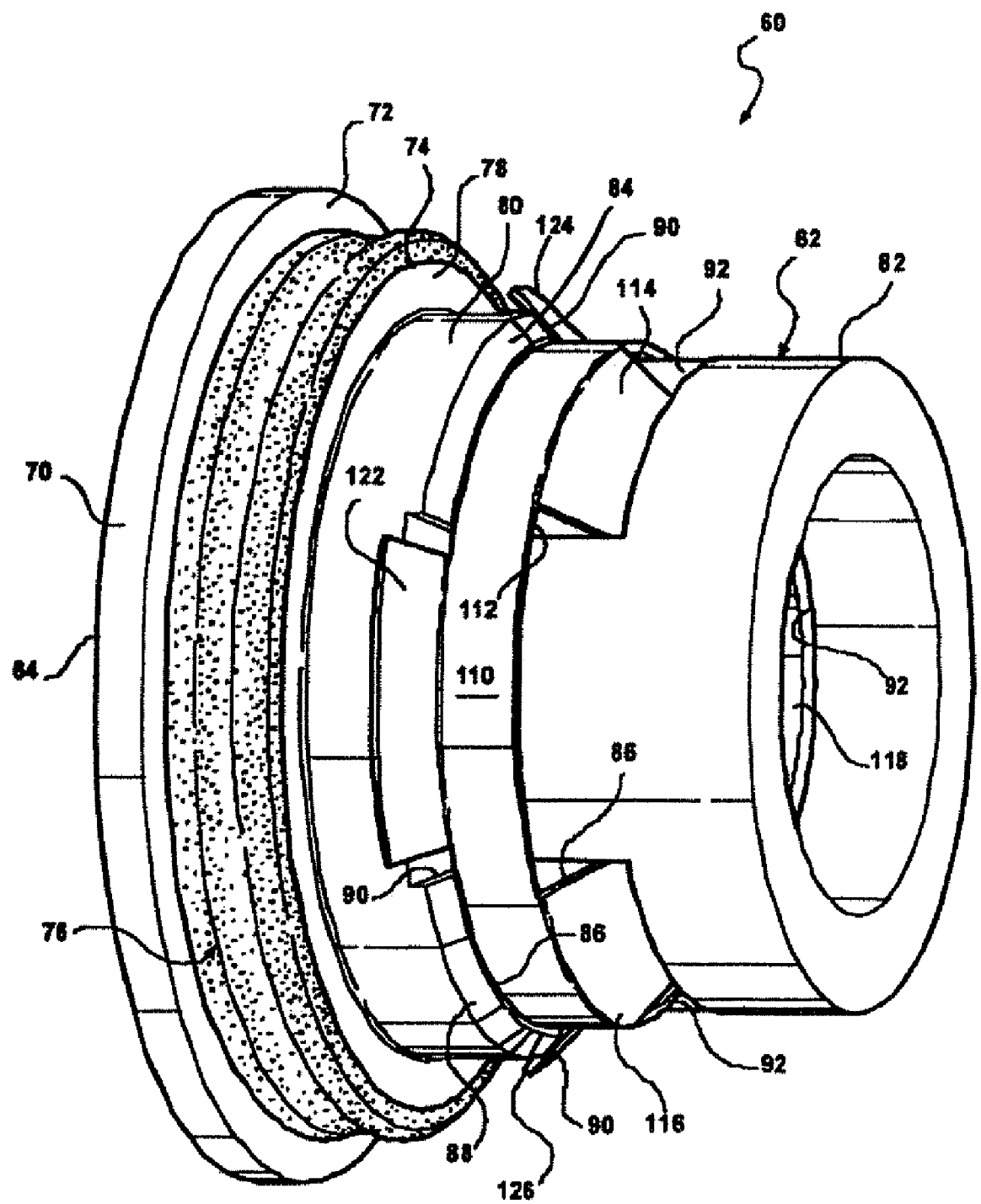
FIG. 3 is a perspective view of the carrier and the retention ring shown in FIGS. 1 and 2.
Figure 4:
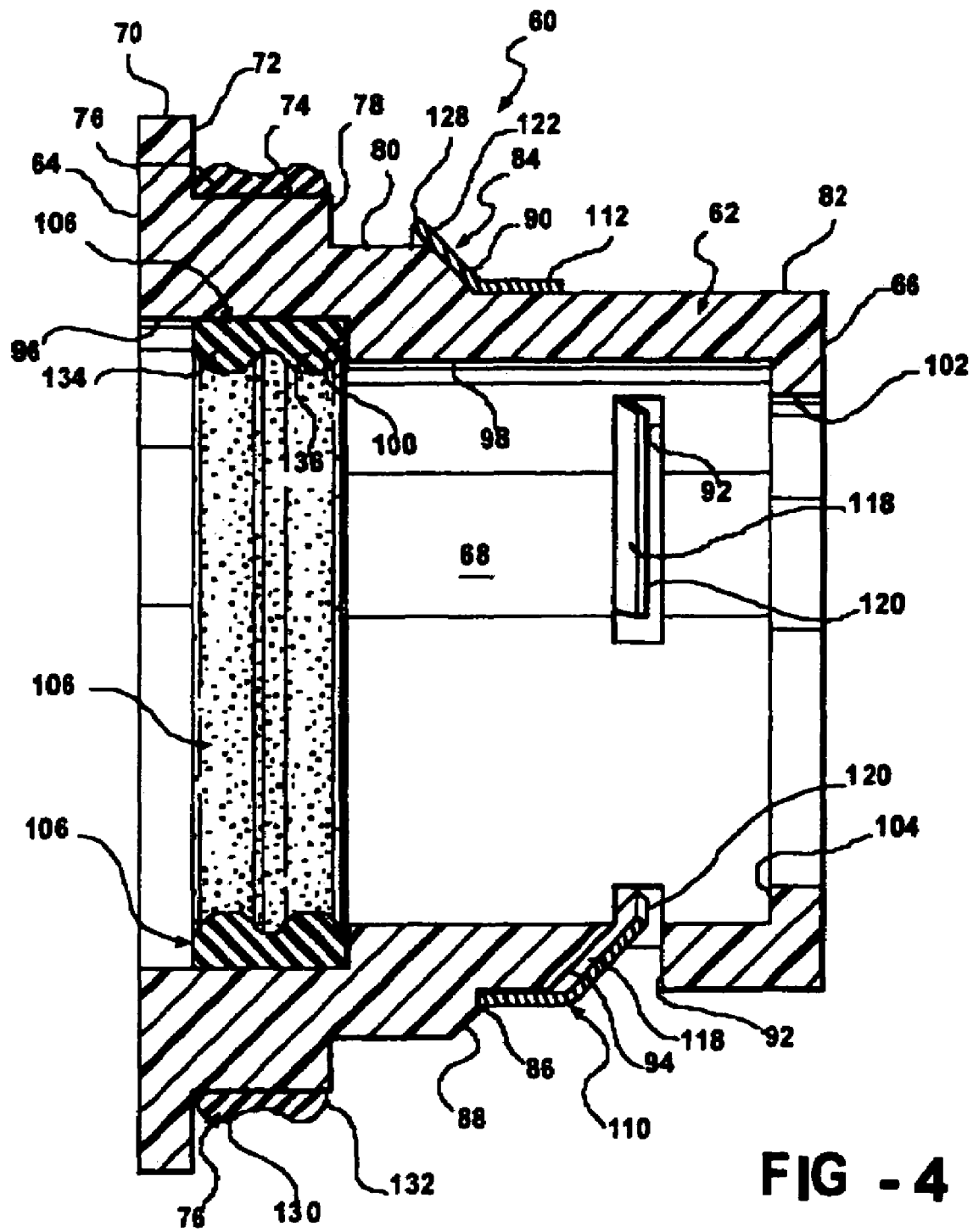
FIG. 4 is a longitudinal, cross sectional view of the carrier and retention ring shown in FIG. 3.
Figure 5:
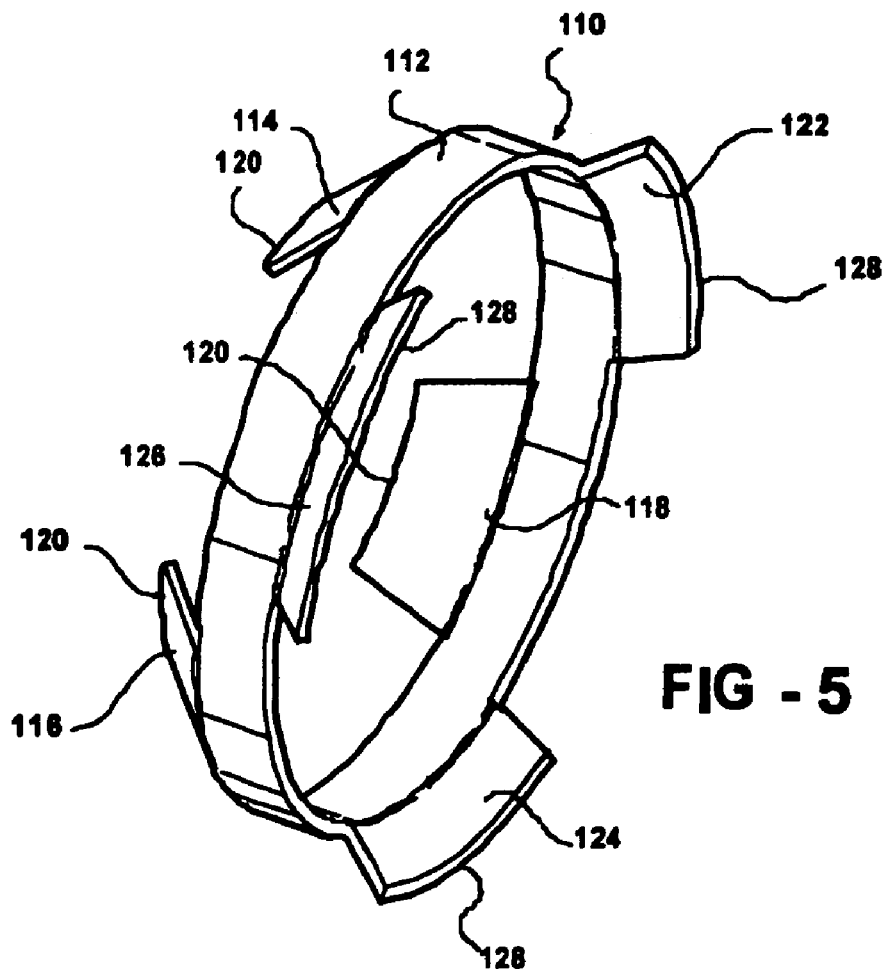
FIG. 5 is a perspective view of the retention ring shown in FIGS. 1-4.
Figure 6:
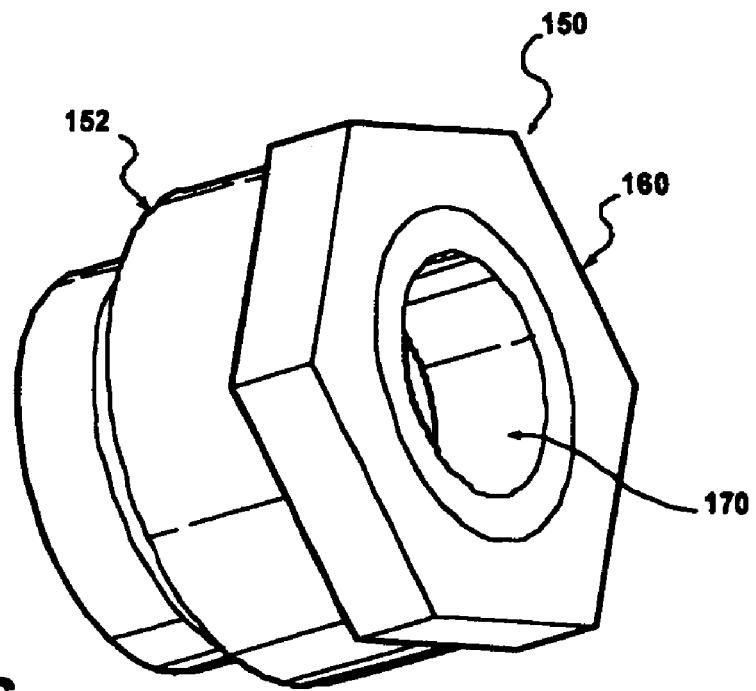
FIG. 6 is a perspective view of another aspect of a fluid coupling.
Figure 7:
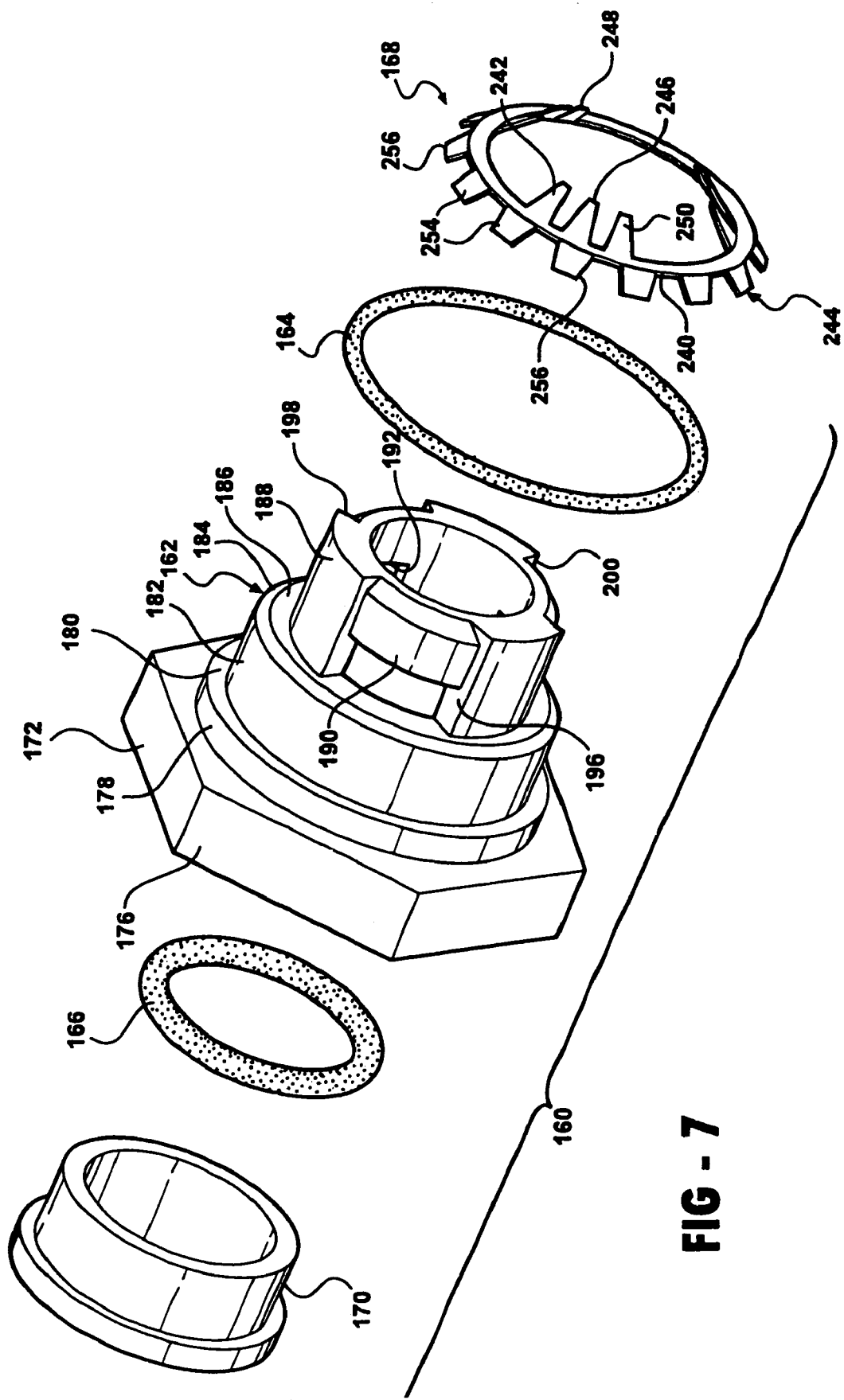
FIG. 7 is an exploded, perspective view of the fluid coupling shown in FIG. 6.
Figure 8:
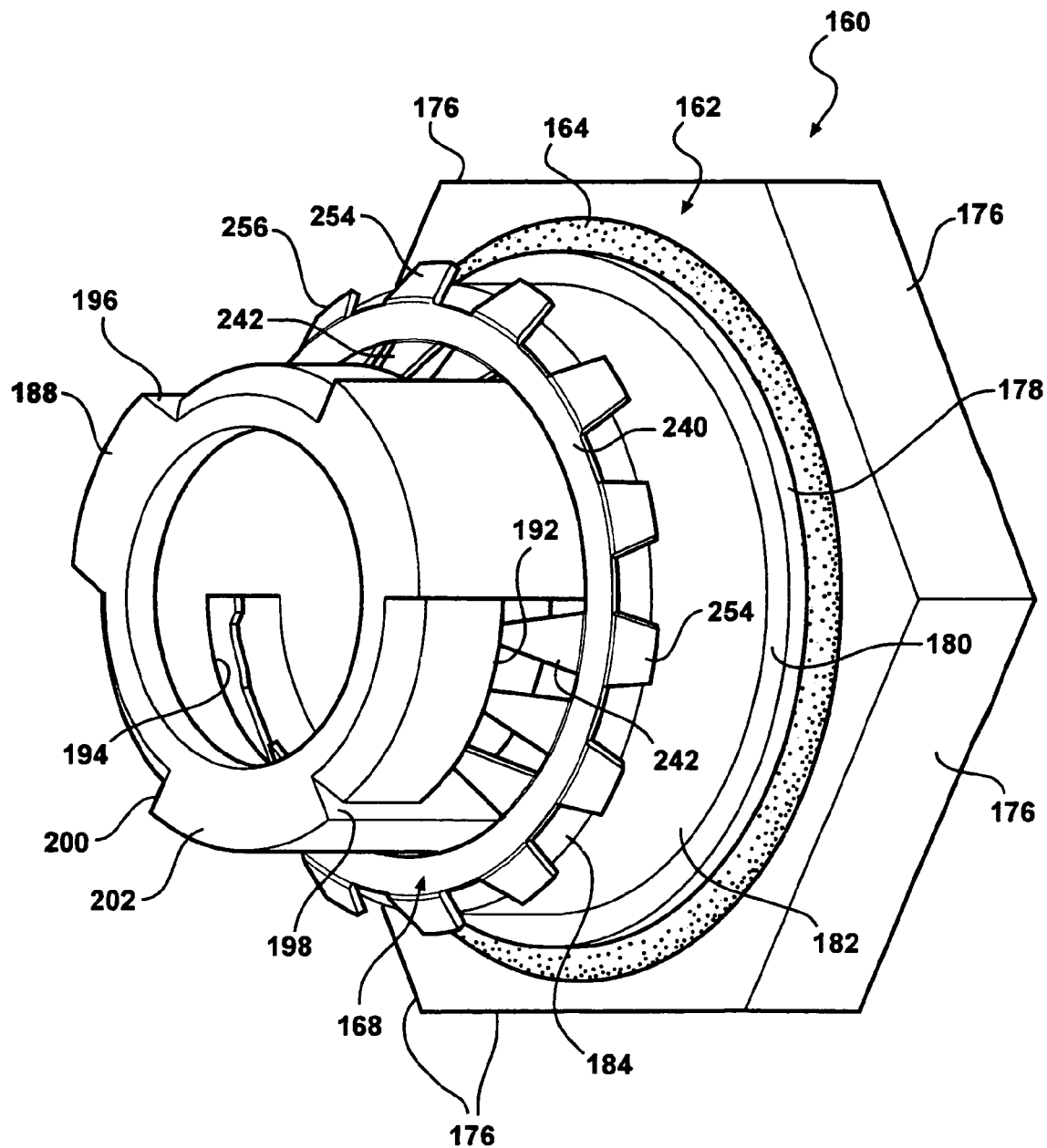
FIG. 8 is a perspective view of the carrier, the retention ring and the seal element of the fluid coupling shown in FIGS. 6 and 7.
Figure 9:
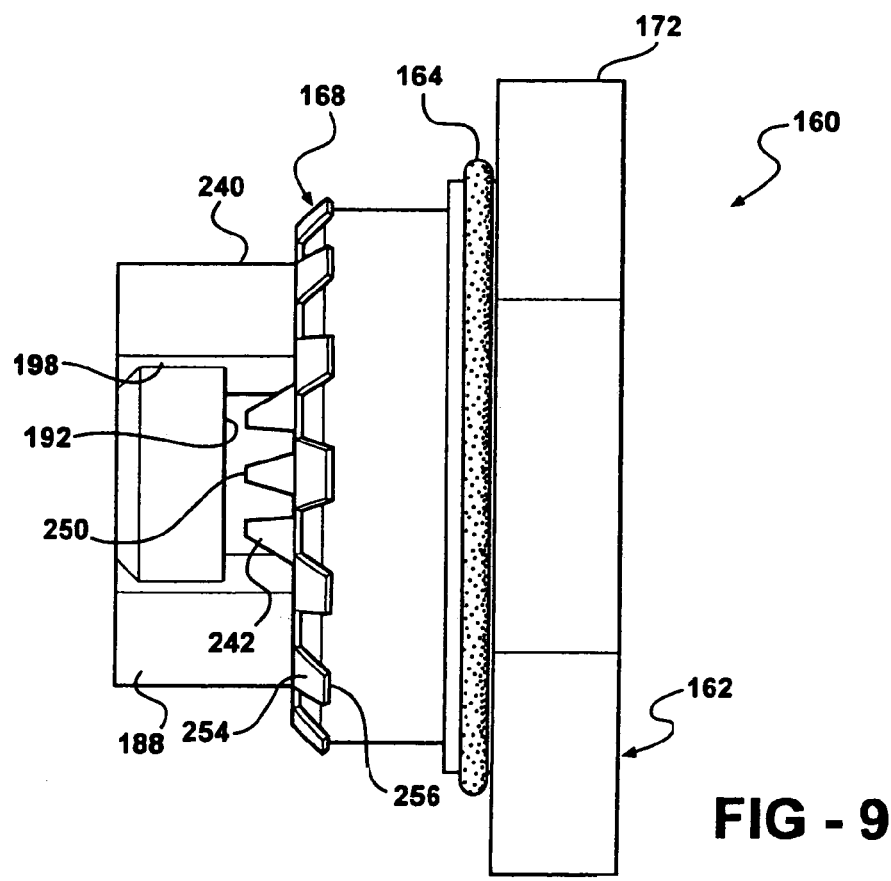
FIG. 9 is a side elevational view of the carrier, the retention ring and the seal elements shown in FIG. 8.

As shown in FIGS. 1 and 2, and in greater detail in FIGS. 3-5, the fluid coupling 20 also includes a carrier 60 which may be in the form of a one-piece molded or machined body 62. The body 62 may be formed of a suitable material, such as metal, plastic, etc.

The body 62 has a first end 64 and an opposed second end 66. A bore 68 extends between the first and second ends 64 and 66. By way of example only, the outer surface of the body 62 has a stepped configuration formed of an end flange 70 adjacent the first end 64. A shoulder 72 defines an angled or generally perpendicular transition from the flange 70 to a reduced diameter ring 74. The ring 74 forms a seat for an outer seal element 76.

A shoulder 78, extending by way of example only, perpendicularly to the major surface of the ring 74, forms a transition between the ring 74 and a second ring 80.

A generally cylindrical, constant diameter sleeve 82 is connected to the second ring 80 by a transition surface 84. The sleeve 82 extends from the transition surface 84 to the second end 66 of the body 62.

The transition surface 84 includes a generally perpendicular wall 86 extending from one end of the sleeve 82. The radially outer end of the wall 86 transitions into an angled or ramped surface 88 extending to one end of the second ring 80. A plurality of notches 90, such as three by way of example, are formed in the transition surface 84 and extend between the sleeve 82 and the second ring 80. The notches 90 are equidistantly spaced and provided at the same spacing and in the same number as the number of outer fingers on the retention ring as described hereafter. The notches 90 form a seat or bearing surface for the outer fingers on the retention ring.

A plurality of apertures, such as three, by way of example only, for a retention ring having three radially inward extending fingers are formed in the sleeve 82 intermediate the second end 66 and the transition surface 84. The apertures or windows 92 open to the bore 68 in the body 62 as shown in FIGS. 2 and 3.

An angled surface 94 is formed through the sleeve 82 and forms one portion of each aperture 92. The surface 94 forms a support or bearing surface for the radially inward extending fingers, as described hereafter.

As shown in FIG. 3, the bore 68 has, by way of example only, a stepped configuration formed of a first diameter bore 96 extending from the first end 64 of the body 62, a second bore 98 extending axially from a shoulder 100 extending perpendicular from one end of the first bore 96, and a third bore 102 extending from a generally perpendicular shoulder 104 projecting from one end of the bore 98.

The shoulder 100 and the adjoining inner surface of the bore 96 forms a seat for a second inner seal element 106. As shown in FIGS. 1-4, and in greater detail in FIG. 5, a retainer or retention ring 110 is mounted on the carrier body 62 and serves the dual function of fixing the endform 22 to the carrier 60 as well as fixing the carrier 60 in the housing 24.

The retention ring 110 which may be formed of a suitable material, typically metal or high strength plastic having resilient and spring characteristics, has an annular band or ring 112 with a diameter to seat on the sleeve 82 of the carrier body 62 as shown in FIGS. 2-4.

At least one or a plurality of radially inward and angularly extending latch members or fingers extend from the band 112. By way of example only, three latch fingers 114, 116 and 118 extend from one edge of the band 112. The fingers 114, 116 and 118 are supported by the surface 94 in each aperture 92. Further, each latch finger 114, 116 118 has an inner tip end, all denoted generally by reference number 120, which extends through each aperture 92 and into the bore 98. This positions the tip ends 120 for fixed engagement with the first endform 22 as shown in FIG. 1.

During assembly of the ring portion 112 of the retention ring 110 on the sleeve 82 of the carrier body 62, the inward extending latch fingers 114, 116 and 118 bend outwards along the surface of the sleeve 82 until the retention ring 110 seats against the surface 86 as shown in FIGS. 1 and 3. At this time, the tip ends 120 of the inner latch fingers 114, 116 and 118 are aligned with the apertures 92 and snap back to their normal, radially inward, angled position shown in FIGS. 2-6. This places the tip ends 120 of the each the latch fingers 114, 116 and 118 in an interference position with respect to the outer surface of the endform 22. During insertion of the endform 22 into the carrier body 62, the tip ends 120 of the latch fingers 114, 116 and 118 will engage and dig into the outer surface of the endform 22. Due to the radially inward extending, angular position of each latch finger 114, 116 and 118, reverse movement in a direction to separate the endform 22 from the carrier body 62 is resisted by the inner latch fingers 114, 116 and 118.

Also, by was of example only, the retention ring 110 includes a plurality of radially outward, angled latch fingers, with three outer latch fingers 122, 124 and 126 being shown by way of example. The outer latch fingers 112, 124 and 126 extend from the opposite side edge of the band 112 in a radially outward, angled direction opposite from the radially inward, angled direction of extent of the inner latch fingers 114, 116 and 118.

Each outer latch finger 122, 124 and 126 is supported on the surface 90 on the carrier body 62 and is disposed within one of the notches 90. This maintains the retention ring 110 in position on the carrier body 62 and, in conjunction with the disposition of the inner fingers 114, 116 and 118 in the apertures 92 in the carrier body 62, resists rotation and separation of the retention ring 110 from the carrier body 62.

As shown in FIGS. 2-4, each outer latch finger 122, 124 and 126 has an outer tip end 128 which is disposed in an interference position with the inner surface of the bore 36 in the housing 24. In this manner, when the carrier 62 is inserted through the open first end 30 of the housing 24, the tip ends 128 of each of the outer latch fingers 122, 124 and 126 will engage and dig into the inner surface of the bore 36. The angular position of each of the outer latch fingers 122, 124 and 126 resists movement of the carrier 62 in an opposite direction from the insertion direction so as to fixedly hold the carrier 60 in the housing 24.

Each of the inner latch fingers 114, 116 and 118 is formed of a generally planar, solid member. It will be understood that each of the inner latch fingers 114, 116 and 118 can be formed of a plurality of separately movable, cantilevered fingers.

Each of the outer latch fingers 122, 124 and 126 is formed, by example only, of a planar, solid member. It will be understood that each of the outer latch fingers 122, 124 and 126 can be formed of a plurality of separately movable, cantilevered fingers.

It should be noted that the angled or ramped surface 50 in the housing 24 opposes and is generally parallel to the angled surface 94 in the carrier body 62. This provides an opening for one of the inner latch fingers 114, 116 or 118. Likewise, the angled surface 48 in the housing 24 opposes and is generally parallel to the angled or ramped surface 90 on the carrier body 60 to form a slot for receiving one of the outer latch fingers 122, 124 and 126

A plurality of seal elements are formed or disposed on the carrier 60 to seal the carrier to the housing 24 and to the endform 22. By way of example only, the seal elements include an outer seal element 72 and the inner seal element 106. Although the outer and inner seal elements 72 and 106 may be formed as separate members from the carrier 60, in one aspect, the inner and outer seal elements 72 and 74 are integrally and fixedly joined to the carrier body 62 by a double shot molding process. This requires that the seal elements 72 and 106 be formed of a material compatible with the molding temperature of the material forming the carrier body 62.

By way of example only, each inner and outer seal element 72 and 106 is formed with one or more lobes, such as lobes 130 and 132 for the outer seal elements 72 and lobes 134 and 136 for the inner seal element 106.

The outer seal element 72 seats on the first ring surface 74 on the carrier body 62. The inner seal element 106 seats on the inner surface of the bore 96 and substantially abuts the shoulder 100 in the carrier body 62.

The fluid coupling 20 can be assembled in two different methods. Both methods start with the seal elements 72 and 106 formed on or otherwise disposed on the carrier body 62. The retention ring 110 is also mounted on the carrier body 62 as described above.

In a first assembly method, the carrier body 62 is inserted through the open first end 30 of the housing 24 as shown in FIG. 2 until the shoulder 78 on the carrier body 62 abuts the shoulder 44 in the housing 24. At this time, the tip ends 128 of the outer latch fingers 122, 124 and 126 engage and dig into the inner surface of the bore 36 in the housing 24 to fixedly latch the carrier 60 to the housing 24.

During this insertion, the lobes 130 and 32 of the outer seal element 72 are compressed to fluidically seal the carrier body 62 to the housing 24.

Next, the tip end of the endform 22 is inserted through the open end 64 of the carrier 60 as shown in FIG. 1. During this insertion, the outer surface of the tip end 22 first sealingly engages the with lobes 134 and 136 of the inner seal element 106. Insertion of the endform 22 continues until the first end 28 abuts the shoulder 104 at the end of the inner bore 98 and the beginning of the bore 102. As the first end 28 of the endform 22 approaches the shoulder 104, the tip ends 120 of the inner latch fingers 114, 116 and 118 engage and dig into the outer surface of the endform 22.

However, as shown in FIG. 2, only the end portion of the endform 22 adjacent to the first end 28 is engaged by the tip ends 120 of the inner latch fingers 114, 116 and 118. The surface of the endform 22 engaged by the inner seal element 106 is never contacted by the inner latch fingers 114, 116 and 118 and thus remains free of scratches, gouges or surface disruptions which could lead to fluid leaks or damage the inner seal element 106.

According to an alternate assembly method, the carrier 60, retention ring 110, and inner and outer seals 72 and 106 are assembled as described above. The first end 28 of the endform 22 is then inserted into the bore 68 of the carrier 60 through the open first end 64 as described above. The inner latch fingers 114, 116 and 118 retain the carrier 60 on the end of the endform 22.

The assembled endform 22 and carrier 60 are then inserted as a unit through the open first end 30 of the housing 20. Due to the different diameter and tapered surface of the bores 36, 38 and 46, respectively, the tip ends 128 of the outer latch fingers 122, 124 and 126 do not engage the inner surface of the bore 36 until the carrier 60 is substantially fully inserted into the bore 32 in the housing 24. At this time, the tip ends 128 of the outer latch fingers 122, 124 and 126 engage the inner surface of the bore 36 in the housing 24 to fix the carrier 60 and the attached endform 22 in the housing 24.

It should be noted that the outer seal element 72 is axially spaced on the carrier body 62 from the tip ends 28 of the outer latch fingers 122, 124 and 126 and is disposed within a different bore 34 than the bore 36 engaged by the outer latch fingers 122, 124 and 126 so as to prevent any scrapping or surface disruptions of the bore 34 which will be engaged by the outer seal element 72.

Figure 10:
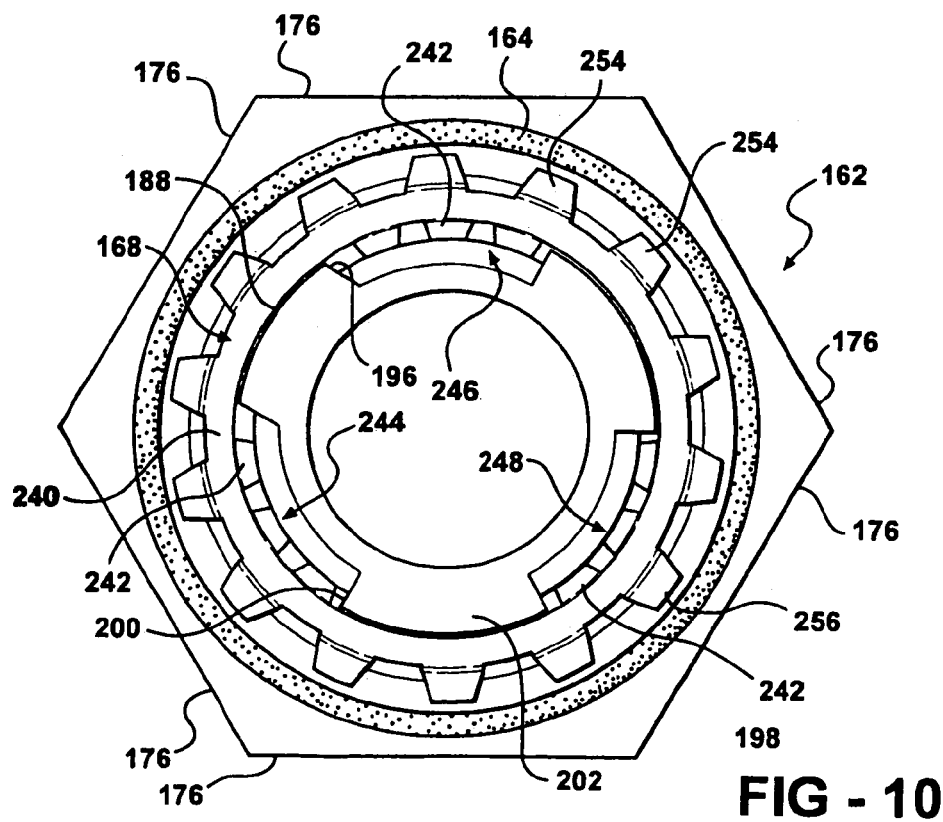
FIG. 10 is a left end view of the carrier, the retention ring and the seal element shown in FIG. 9.
Figure 11:
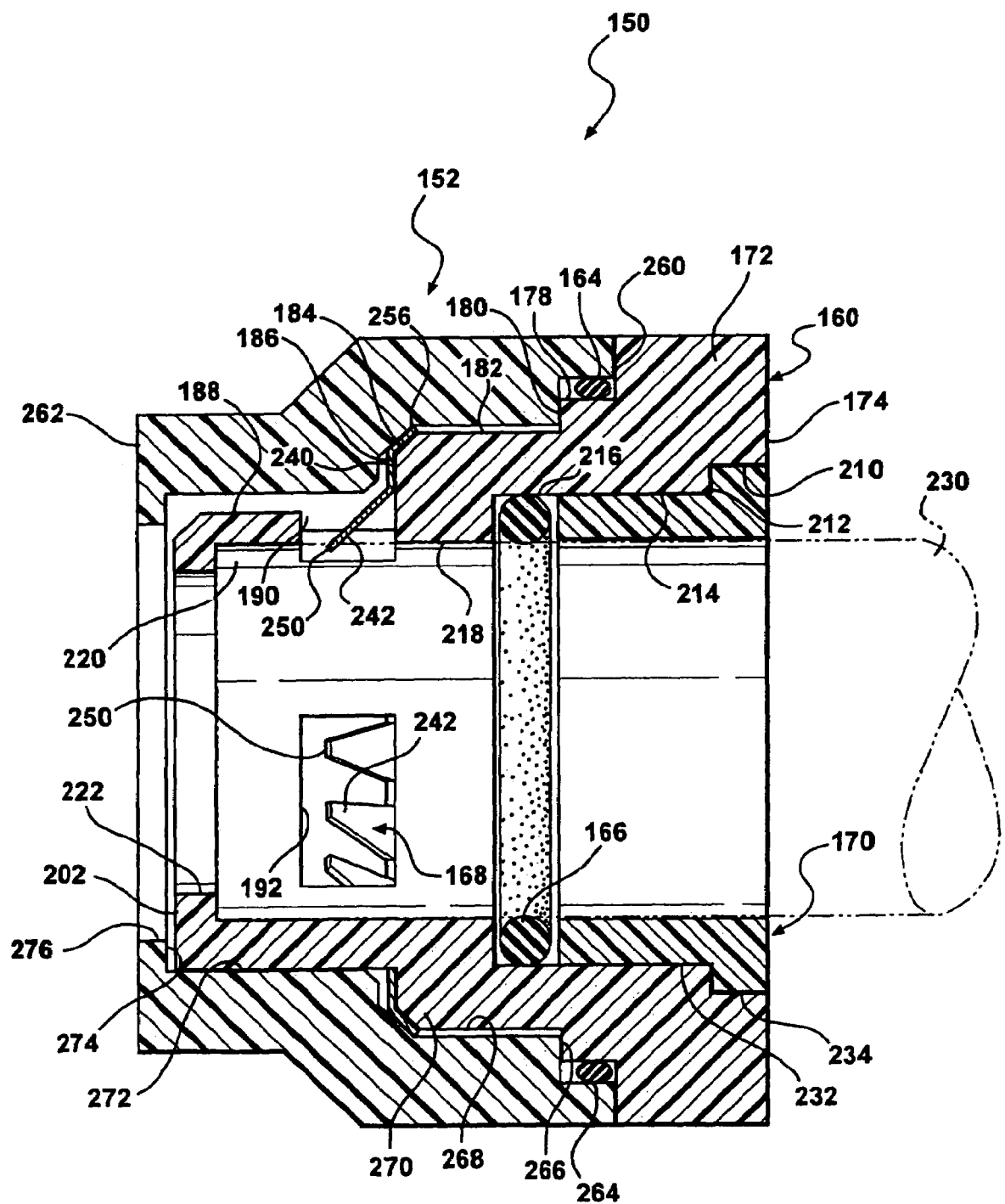
FIG. 11 is a longitudinal cross sectional view of the fluid coupling shown in FIG. 6.

Referring now to FIGS. 6-11, there is depicted another aspect of a fluid coupling 150 which is used to fluidically couple an endform, such as the endform 22 described above and shown in FIGS. 1-3 to a fluid use element 152 depicted in FIG. 11 as being in the form of a housing.

The fluid coupling 150 includes a carrier 160 formed of a carrier body 162, an outer seal element, such as an O-ring 164, an inner seal element or O-ring 166, a retainer or retention ring 168, and a top hat 170.

The carrier body 162 may be a one-piece body formed of a molded or machined plastic. The carrier body 162 includes an end flange 172 which extends from a first end 174 of the carrier body 162. The peripheral surface of the end flange 172 may be formed with a plurality of flats 176, such as hex flats, which provide a tool engagement surface for receiving a wrench or socket to facilitate removal of the carrier 162 from the housing 152, as described hereafter.

A first annular ring 178 projects at a smaller diameter from one end of the end flange 172. The first ring 178 forms a support surface or seat for the first outer seal element or O-ring 164.

A shoulder 180 forms a transition between the first ring 178 and a second ring 182 which has a smaller diameter than the first ring 178.

A transition surface 184, which is disposed at a non-perpendicular angle from the second ring 182, extends from one end of the second ring 182 and transitions into a generally perpendicularly extending flat 186. A generally cylindrical sleeve 188 extends axially from the flat 186.

A plurality of apertures or windows, with three apertures 190, 192 and 194 shown by example only, are formed in and through the sleeve 188 generally adjacent to the flat 186. Each of the apertures or windows 190, 192 and 194 opens to the interior bore extending through the carrier body 162.

A plurality of notches, such as three notches 196, 198 and 200, for example only, are formed in the sleeve 188 and extend from a second end 202 of the carrier body 162 to each of the apertures 190, 192 and 194, respectively. Each of the notches 196, 198 and 200 forms a reduced diameter portion, aligned with one of the windows 190, 192 and 194, to orient the inner latch fingers of the retention ring 168 and to prevent over bending of the inner latch fingers beyond their normal capacity to resiliently return to a nominal position during insertion of the retention ring 168 on the sleeve 188.

The forward end of each notch 196, 198 and 200 is angled from the second end 202 of the carrier body 162 to form a ramp surface for the inner latch fingers of the retainer 168 during mounting of the retainer 168 on the sleeve 188 of the carrier body 162, as described hereafter.

As shown in FIG. 11, the carrier body 162 has a first bore 210 extending from the first end 174. The first bore 128 ends at a shoulder 212 which extends generally perpendicular from the bore 210 to a second smaller diameter bore 214. The second bore 214 extends co-axially from the first bore 210 and terminates in an angular shoulder 216 which is generally perpendicular to a longitudinal axis though the carrier body 162.

The shoulder 216 transitions to a third bore 218 which extends to an end shoulder 220. The end shoulder 220, also disposed generally perpendicular to a longitudinal axis through the carrier body 162, transitions into a fourth bore 222 at the second end 202 of the carrier body 160. The shoulder 220 forms an insertion limit or stop for receiving the first inserted end of an endform 230, shown in phantom in FIG. 11.

The shoulder 216 forms a seat for the inner seal element or O-ring 166. The second bore 214 is sized to slidably receive a sleeve 232 of the top hat 170. A flange 234 at one end of the sleeve 232 of the top hat 170 seats within the first bore 210 against the shoulder 212. The top hat 170 functions to hold the second seal element 166 in the carrier body 160.

As shown in FIGS. 6-10, the retainer 168 includes a central ring 240. When the retainer 168 is mounted on the sleeve 188 of the carrier body 162, the generally flat ring 240 seats against the flat 186 on the carriet body 162. This places the major surfaces of the ring or band 240 at an angle, typically perpendicular, to the longitudinal axis of the carrier body 162 thereby increasing the pullout resistance provided by the retention ring between the carrier body 162, the endform 230 and the housing 152.

The retention ring 168 also includes at least one or more inner latch fingers, each denoted by reference number 242. By example only, the inner latch fingers are arranged in three equi-circumferentially spaced groups of inner latch fingers 244, 246 and 248, each formed of at least one and, typically, more than one latch finger, with three latch fingers 242 forming each of the groups 244, 246 and 248. Each of the latch fingers 242 in each group 244, 246 and 248 is also equally spaced from adjacent latch fingers 242 in each group 244, 246 and 248.

The latch fingers 242 extends through the apertures 190, 192 and 194 in the sleeve 188 of the carrier body 162 and have a tip end 250 which projects radially inward of the inner surface of the bore 218 so as to be disposed in an interference position with the outer surface of the endform 230.

During insertion of the retention ring 180 over the sleeve 188, the latch fingers 242 in each group of latch fingers 244, 246 and 248 slide along the ramp surface on the end of the notches 196, 198 and 200 and bend radially outward until the ring 240 of the retention ring 168 is inserted sufficiently far enough over the sleeve 188 to enable the tips ends 250 of the latch fingers 244 to snap back to their nominal position shown in FIG. 10.

The retention ring 168 also includes at least one or more outer latch fingers 254. By way of example only, the plurality of latch fingers 254 are equi-circumferentially spaced about the entire periphery of the ring 240. It will be understood that the outer latch fingers 254 may be provided in more or less numbers than that illustrated in FIGS. 6-9 as well as being provided in circumferentially spaced groups akin to the groups 244, 246, 248 of the inner latch fingers 242.

Each of the outer latch fingers 254 terminates in a radially outer tip 256 which is disposed radially and angularly outward from one edge of the ring 240 of the retention ring 268. The tip 256 of each outer latch finger 254 is disposed in an interference position with respect to an inner surface of the housing 152.

By way of example only, the housing 152 includes a first end 260 and an opposed second end 262. A bore means extends between the first and second ends 260 and 262. The bore means includes a first bore 264 extending from the first end 260 which terminates in a perpendicularly extending shoulder 266. A second bore 268 extends from a radially inner edge of the shoulder 266 to a transition surface which forms a ramp or angled surface 270 with respect to a longitudinal axis extending through the housing 162. A third bore 272 extends from the transition surface 270 to an end shoulder 274. The end shoulder 274 transitions into a fourth bore 276.

Like the first aspect of the fluid coupling described above, the carrier body 160 carrying the seals 164 and 166, the retention ring 168 and the top hat 170, after preassembly, may be mounted on the end of the endform 230 prior to insertion of the carrier 160 and endform 230 into the housing 252. Alternately, the carrier 260 may be pre-mounted in the housing 152 and then the endform 230 inserted and latched to the carrier 160.

During such assembly, the outer or first seal 164 seats between the first ring 178 of the carrier 160 and the spaced inner bore 164 of the housing 152 to seal the carrier 160 to the housing 162. The second seal element 166 seats against the shoulder 216 and the carrier 160 and is held in the carrier 160 by the top hat 170.

It will be noted that the inner or second seal element 166 is axially spaced outward with respect to the insertion direction of the endform 230 into the carrier 160. In this manner, any portion of the outer surface of the endform 230 which is engaged and which may be scratched by the tip ends 250 of the inner latch fingers 242 does not come into contact with the inner surface of the second seal element 166.

In the assembled position shown in FIG. 10, the ring 240 extends generally perpendicularly with respect to the longitudinal axis of the coupling 150. This provides a stronger seat or mount of the retainer 168 between the carrier 160 and the housing 152 than the generally horizontal disposition of the band 112 of the retention ring 110 in the first aspect of the fluid coupling 20.

In another aspect, the inner latch fingers 242 or the outer latch fingers 254 may be provided with a helical or spiral configuration about the circumference of the retention ring 168. This can be achieved by varying the length of each inner latch finger 244 or each outer latch finger 254 starting with a first shortest length inner latch finger 242 or outer latch finger 254 and gradually increasing the length of each adjacent inner latch finger 242 or outer latch finger 254 going about the circumference of the retainer 168 to a longest length inner latch finger 242 or outer latch finger 244. This creates a helical arrangement of the tip ends 250 of the inner latch fingers 242 or the tip ends 256 of the outer latch fingers 254. Where the inner latch fingers 242 are formed with the helical length configuration, the endform 230 may be unthreaded by applying a rotative unthreading force to the endform 230 or to the joined carrier 160 and housing 152 to separate the housing 152 and carrier 160 from the endform 230.

Alternately, where the outer latch fingers 254 have a helical length configuration, the joined endform 230 and carrier 160 may be unthreaded relative to the housing 152 as a complete assembly.

In conclusion, there has been disclosed a unique fluid coupling in which a single retention ring serves the dual function of latching an endform to a carrier as well as latching the carrier to a mating housing or fluid element. The single retention ring enables dissimilar materials with different melt temperatures to be used to construct the quick connect and to join the quick connect to an endform since the endform and the quick connect components are not sonic or heat welded together.

What is claimed is:

1. A fluid coupling comprising:
   a fluid use element including a bore extending from an open end, the bore having an inner surface;
   a carrier having a bore extending between first and second ends, at least one aperture formed in the carrier intersecting the bore;
   a retention ring mounted on the carrier, the retention ring having a central ring having a major plane, said central ring having at least one inward finger angularly extending out of the plane from an inner peripheral edge of the central ring and having a tip end extending through the aperture into the bore in the carrier, and at least one outward finger angularly extending out of the plane from an opposing outer peripheral edge of the central ring, said at least one outward finger having opposing faces; and a tip end extending outward from the carrier, the tip end of the outward finger engaging the inner surface of the bore in the fluid use element to fix the carrier to the fluid use element and said opposing faces are in surface to surface contact with a ramped transition surface in the bore and a complementary ramped transition surface on the exterior of the carrier; and
   the tip end of the inward finger on the retention ring engaging an endform to fix the endform to the carrier.

2. The fluid coupling of claim 1 further comprising:
   an outer seal element for sealing the carrier in the bore of the fluid use element.

3. The fluid coupling of claim 1 further comprising:
   an inner seal element disposed in the bore in the carrier for sealing the endform to the carrier.

4. The fluid coupling of claim 3 further comprising: an outer seal element for sealing the carrier in the bore of the fluid use element.

5. The coupling of claim 4 wherein:
   at least one of the inner seal element and the outer seal element is separate from the carrier.

6. The fluid coupling of claim 5 further comprising:
   a top hat mounted in the bore of the carrier for holding the inner seal element in the bore in the carrier.

7. The fluid coupling of claim 4 further comprising:
   the inner seal element axially disposed between the at least one inward finger on the retainer on the retention ring and the first end of the carrier.

8. The fluid coupling of claim 4 further comprising:
   the outer seal element axially disposed between the at least one outward extending finger on the retention ring and the first end of the carrier.

9. The fluid coupling of claim 3 wherein:
   at least one of the inner seal element and the outer seal element is integrally joined to the carrier by double shot molding.

10. The fluid coupling of claim 1 wherein at least one inward finger comprises:
    a plurality of circumferentially spaced inward fingers wherein adjacent inward fingers are spaced a first predetermined distance from each other.

11. The fluid coupling of claim 10 wherein:
    the plurality of circumferentially spaced inward fingers are equi-circumferentially spaced about the retention ring.

12. The fluid coupling of claim 10 wherein: each of the inward fingers defines a solid member.

13. The fluid coupling of claim 10 wherein each of the inward fingers comprises:
    a plurality of circumferentially spaced groups of discrete inward fingers;
    wherein adjacent groups are spaced a second predetermined distance from each other, wherein said second predetermined distance is greater than the first predetermined distance.

14. The fluid coupling of claim 13 wherein the plurality of groups of inward fingers comprises:
    three circumferentially spaced groups of inward fingers.

15. The fluid coupling of claim 10 wherein each of the plurality of inward fingers has a gradually increasing length from a first shortest length inward finger to a last longest length inward finger with at least one middle length inward finger between the first shortest length inward finger and the last longest length inward finger, tip ends of the plurality of inward fingers laying along a helical path to form a thread edge.

16. The fluid coupling of claim 10 further comprising:
    a plurality of apertures formed in the carrier, each aperture receiving at least one inward finger.

17. The fluid coupling of claim 16 further comprising:
a plurality of orienting notches formed in the carrier, one notch axially aligned with one aperture extending from the second end of the carrier.

18. The fluid coupling of claim 1 wherein the retention ring comprises:
a flat band having first and second opposed edges, the at least one inward finger extending from the first edge and the outward fingers extending from the second edge; and
a flat formed on the carrier substantially perpendicular to a longitudinal axis to the carrier, the band of the retention ring disposed on the flat on the earner.

19. The fluid coupling of claim 1 wherein the retention ring comprises:
a flat band having first and second circumferentially spaced edges, the at least one inward finger extending from the first edge and the at least one outward finger extending from the second edge; and
a flat formed on the carrier substantially perpendicular to a longitudinal axis of the carrier, the band of the retention ring disposed on the flat on the carrier.

20. The fluid coupling of claim 1 wherein the at least one outward finger comprises a plurality of outward fingers.

21. The fluid coupling of claim 20 wherein:
the plurality of outward fingers comprises a plurality of equi-circumferentially spaced outward fingers.

22. The fluid coupling of claim 20 wherein: each of the outward fingers is a solid member.

23. The fluid coupling of claim 20 wherein the plurality of outward fingers extends over substantially an entire periphery of the retention ring.

24. The fluid coupling of claim 20 wherein each of the plurality of outward fingers has a gradually increasing length from the retention ring from a first shortest length outward finger to a last longest length outward finger with at least one middle length outward finger between the first shortest length outward finger and the last longest length outward finger, tip ends of the plurality of outward fingers laying along a helical path to form a thread edge.

25. The fluid coupling of claim 1 further comprising:
the carrier having an end flange directly contacting the fluid use element when the carrier is mounted in the bore in the fluid use element.

26. The fluid coupling of claim 25 wherein the end flange further comprising:
a plurality of tool engaging flats formed on the end flange.

* * * * *